(12) United States Patent
Wang

(10) Patent No.: US 7,965,280 B2
(45) Date of Patent: Jun. 21, 2011

(54) WAIT MODE PEN-TOUCH DETECTION AND METHOD FOR TOUCH SCREEN CONTROLLER

(75) Inventor: Ing-Yih Wang, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 1105 days.

(21) Appl. No.: 11/717,952

(22) Filed: Mar. 14, 2007

(65) Prior Publication Data

US 2008/0225010 A1   Sep. 18, 2008

(51) Int. Cl.
*G06F 3/041* (2006.01)
(52) U.S. Cl. .................................................. 345/173
(58) Field of Classification Search ............. 345/173, 345/156, 174, 179
See application file for complete search history.

(56) References Cited

U.S. PATENT DOCUMENTS

| | | | |
|---|---|---|---|
| 4,386,232 A * | 5/1983 | Slater ........................... | 345/173 |
| 6,246,394 B1 | 6/2001 | Kalthoff et al. ............... | 345/173 |
| 6,292,179 B1 * | 9/2001 | Lee ............................... | 345/173 |
| 6,738,048 B1 | 5/2004 | Rundel .......................... | 345/173 |
| 2001/0053707 A1 * | 12/2001 | Lutnaes ......................... | 455/566 |
| 2004/0095266 A1 * | 5/2004 | Kernahan et al. ............. | 341/165 |
| 2004/0140958 A1 * | 7/2004 | Tsai et al. ..................... | 345/173 |

* cited by examiner

*Primary Examiner* — Richard Hjerpe
*Assistant Examiner* — Jeffrey Parker
(74) *Attorney, Agent, or Firm* — John J. Patti; Wade J. Brady, III; Frederick J. Telecky, Jr.

(57) ABSTRACT

A touch screen controller (1A) includes circuitry (2B) for generating a pen touch detection signal (PENTOUCH) having a first level if a touch point (Q) of a touch screen assembly (30,31) including first (30) and second (31) resistive screens is detected, and generating a second level of the pen touch detection signal if a touch point is not detected. A controller (41A) includes circuitry (58A) that generates an interrupt signal (IRQ) to be sent to a host processor (3) in response to the first level of the pen touch detection signal and for resetting the interrupt signal (IRQ) in response to the second level of the pen touch detection signal if the second level is received before a convert command is received from the host processor. The interrupt signal (IRQ) represents an interrupt service request for a convert command from the host processor (3). Resetting of the interrupt signal (IRQ) has the effect of canceling the interrupt service request.

19 Claims, 5 Drawing Sheets

# WAIT MODE PEN-TOUCH DETECTION AND METHOD FOR TOUCH SCREEN CONTROLLER

BACKGROUND OF THE INVENTION

The present invention relates generally to touch screen controllers, and more particularly to improved pen-touch detection circuits and methods therein which avoid the amount of time and the amount of power consumption and communication burden on a host processor which are associated with false pen-touch occurrences.

The prior art is believed to include commonly assigned U.S. Pat. No. 6,246,394 entitled "Touch Screen Measurement Circuit and Method" issued Jun. 12, 2001 to Kalthoff et al., incorporated herein by reference. Also, commonly assigned U.S. Pat. No. 6,738,048 entitled "Touch Screen Controller" issued May 18, 2004 to Bernd M. Rundel, also incorporated herein by reference, is indicative of the state of the art.

As shown in "Prior Art" FIG. 1 herein, the '394 patent discloses a touch screen digitizing system which includes a touch screen unit or assembly 30,31 including a first resistive screen 30 with opposed x+ and x− terminals, a second resistive screen 31 with opposed y+ and y− terminals, and an ADC 22. The various terminals of touch screen assembly 30,31 are connected to corresponding terminals of a touch screen controller (TSC) chip 1A including a first switch 19 which is coupled between a first reference voltage (ground) and the x− terminal, and a second switch 18 which is coupled between the x+ terminal and a second reference voltage $+V_{CC}$ for energizing the first resistive screen 30. A third switch 21 is coupled between ground and the y− terminal, and a fourth switch 20 is coupled between the y+ terminal and $V_{CC}$ for energizing the second resistive screen 31. Switching circuitry 15,17 couples an input of the ADC 22 to the y+ terminal while the first resistive screen 30 is energized and the second resistive screen 31 is not energized, and also couples the input to the x+ terminal while the second resistive screen 31 is energized and the first resistive screen 30 is not energized. More specifically, the various terminals of the resistive screens 30 and 31 are connected to the drains of the various corresponding driver transistors 18, 19, 20 and 21. The structure provides continuous calibration of the full-scale analog touch screen output of the full-scale digital output of the ADC 22 by means of conductors 42, and also includes a data register 48 which receives/updates the analog to digital conversion results from ADC 22 so they are available to be read by the host processor by a control/data bus 40. Control circuit 41 also can generate a processor interrupt request signal IRQ on conductor 47.

FIG. 2 shows a simplified diagram prior art pen-touch detection circuit 2A which is included in touch screen controller 1A of FIG. 1. Touch screen assembly 30,31 in FIG. 2 includes the x resistive sheet 30 and the y resistive sheet 31 as shown in FIG. 1. Pen-touch detection circuit 2A includes N-channel driver transistor 21 of FIG. 1 coupled between y-conductor 25 and ground, with its gate connected by conductor 46 to control unit 41.

x+ conductor 27 is coupled to the source of N-channel transistor 32, the drain of which is connected by conductor 36 to one terminal of a pull-up resistor 39, to the input of a buffer circuit 38, and to the drain of a N-channel transistor 35 having its source connected to ground. (As a practical matter, N-channel transistor 32 could be part of a CMOS transmission gate which includes a P-channel transistor connected in parallel with N-channel transistor 32.) The other terminal of pull-up resistor 39 is connected to $V_{DD}$. The gate of transistor 32 is connected to the output of an inverter 33 having its input connected by conductor 34 to control unit 41. The gate of transistor 35 is connected by conductor 45 to control unit 41. Transistor 35 is turned on after a low level of PENTOUCH on conductor 37 is achieved as a result of detection of a touch point Q in order to hold that level after transistor 32 is turned off to allow the various driver transistors to be controlled so as to allow analog to digital conversion of the various touch screen terminal voltages. The output of buffer circuit 38 produces a pen-touch signal PENTOUCH on conductor 37 and applies it to an input of control unit 41. Control unit 41 produces the interrupt request signal IRQ on conductor 47 and applies it to an interrupt request input of host processor 3.

Prior art touch detection circuit 2A in FIG. 2 indicates whether or not there presently is a touch point Q at which there is electrical contact between the x resistive sheet 30 and the y resistive sheet 31 (FIG. 1) due to pen-touch pressure at on touch screen assembly 30,31 at the touch point Q. When transistor 21 is turned on, pen touch detection circuit 2A is ready for pen-touch detection operation. There is a current path from $V_{DD}$ to ground, through pull-up resistor 39, through transistor 32, x+ port conductor 27, the x and y touch screen resistances connected by the electrical contact caused by touch point Q, and driver transistor 21.

The pen-touch detection operation of touch screen controller 1A of FIG. 1, which includes pen-touch detection circuit 2A in FIG. 2, is generally indicated in blocks 50 and 51 of FIG. 3. If the determination of decision block 51 in FIG. 3 is negative, the algorithm performed by pen-touch detection circuit 2A returns to the beginning of the pen-touch detection operation indicated in block 50 and "idles" until an affirmative determination is made in decision block 51. When such an affirmative determination is made in accordance with decision block 51, touch screen controller 2A generates an interrupt request signal IRQ and sends it via conductor 47 to host processor 3, as indicated in block 52.

The program then goes to decision block 53 and simply waits for host processor 3 to decide to send a convert command in response to the interrupt request of block 52. When the convert command eventually is received, touch screen controller 1A proceeds with analog to digital conversion of the present x and y touch point coordinate voltages, irrespective of whether or not they are still valid. After the analog to digital conversion is complete, the operation of touch screen controller 1A and pen-touch detection circuit 2A returns to the beginning of pen-touch detection block 50 as indicated in FIG. 3.

From the beginning of an interrupt request sent by touch screen controller 1A on conductor 47 until the time it receives a "convert" command (i.e., a command from host processor 3 to cause touch screen controller 1A to begin analog to digital conversion of the touch point coordinate voltages on conductors 24, 25, 26 and 27), touch screen controller 1A is in a "wait mode" that may last so long that the pen-touch point Q has disappeared due to loss of adequate pen-touch pressure on the surface of touch screen panel assembly 30,31. This means that the interrupt request IRQ caused by detection of the now invalid pen-touch is also invalid. In the case of touch screen controller 1A being set to a wait mode as indicated in decision block 53, touch screen controller 1A must wait until host processor 3 decides to send a convert command back to touch screen controller 1A and causes it to perform an analog to digital conversion of the invalid x and y terminal voltages before touch screen controller 1A is able to again detect any further pen touch pressure points Q. Typically, there are numerous such "false touches" on touch screen panel 30,31 which causes the occurrence of numerous wait mode states of touch screen controller 1A. This causes numerous time-consuming and power-consuming analog to digital conversions of the invalid pen-touch points, thereby causing inefficient touch screen controller operation.

Thus, conventional touch screen controller 1A (which includes pen-touch detection circuit 2A) simply "waits" for host processor 3 to send it a "convert" command in response to the interrupt request, to cause touch screen controller 1A to perform the needed analog-to-digital conversion(s) of the coordinates of the present touch point. But there is no continued pen-touch detection operation by pen-touch detector circuit 2A during the "wait" times. The low level of the signal PENTOUCH on conductor 37 is latched into logic circuitry of control unit 41, and host processor 3 eventually responds to the interrupt request IRQ by sending a convert command to touch screen controller 1A, which then converts the analog x and y touch point coordinate voltages into corresponding digital touch point coordinates which are then stored in data register 48 (FIG. 1) and read by host processor 3 via data bus 40.

If the touch point Q disappears, the signal PENTOUCH goes to a high logic level, which causes control unit 41 to turn off transistor 32 and turn on transistor 35 to hold the pen touch signal level PENTOUCH while transistor 32 is off. In response to the eventual convert command from host processor 3, the appropriate driver transistors are turned on as mentioned above with reference to FIG. 1, but since no meaningful analog signals representing x and y coordinates of a valid touch point Q are presently being generated, the analog to digital conversion results are meaningless.

Host processor 3 then is required to read the meaningless conversion results due to the false pen-touch detection before going back to the pen-touch detection operation according to blocks 50 and 51 in FIG. 3 to determine that the previously detected touch point is now invalid. Furthermore, host processor 3 must also perform the somewhat complicated steps of recognizing and disregarding the invalid conversion results that it has read from data register 48 in touch screen controller 1A.

Another problem with the foregoing prior art pen-touch circuit and procedure is that if the present touch point Q disappears, i.e., there is a false touch point detection, and then a substantial amount of time and power are wasted performing a meaningless analog to digital conversion of the false touch point.

Thus, there is an unmet need for an improved pen-touch detection circuit and method and a touch screen controller which avoids the need for a host processor to read meaningless analog to digital conversion results that are caused by false pen-touch detection.

There also is an unmet need for an improved pen-touch detection circuit and method that avoids the need for a host processor to perform the steps of recognizing and disregarding invalid analog to digital conversion results read from a touch screen controller.

There also is an unmet need for an improved touch screen controller and pen-touch detection circuit and method that avoid wasting of a substantial amount of time and power incurred in performing meaningless analog to digital conversions of false or invalid touch points and incurred in associated bus communications with a host processor.

SUMMARY OF THE INVENTION

It is an object of the invention to provide an improved pen-touch detection circuit and method and a touch screen controller which avoids the need for a host processor to read meaningless analog to digital conversion results that are caused by false pen-touch detection.

It is another object of the invention to provide an improved pen-touch detection circuit and method that avoids the need for a host processor to perform the steps of recognizing and disregarding invalid analog to digital conversion results read from a touch screen controller.

It is another object of the invention to provide an improved touch screen controller and pen-touch detection circuit and method that avoid wasting of a substantial amount of time and power incurred in performing meaningless analog to digital conversions of false or invalid touch points and incurred in associated bus communications with a host processor.

Briefly described, and in accordance with one embodiment, the present invention provides a touch screen controller (1A) includes circuitry (2B) for generating a pen touch detection signal (PENTOUCH) having a first level if a touch point (Q) of a touch screen assembly (30,31) including first (30) and second (31) resistive screens is detected, and generating a second level of the pen touch detection signal if a touch point is not detected. A controller (41A) includes circuitry (58A) that generates an interrupt signal (IRQ) to be sent to a host processor (3) in response to the first level of the pen touch detection signal and for resetting the interrupt signal (IRQ) in response to the second level of the pen touch detection signal if the second level is received before a convert command is received from the host processor. The interrupt signal (IRQ) represents an interrupt service request for a convert command from the host processor (3). Resetting of the interrupt signal (IRQ) has the effect of canceling the interrupt service request.

In one embodiment, touch screen controller circuitry includes pen touch detection circuitry (2B) for providing a pen touch detection signal (PENTOUCH) having a first level if a touch point (Q) of a touch screen assembly (30,31) including first (30) and second (31) resistive screens is detected and having a second level if a touch point (Q) is not detected and a control circuit (41A) for receiving the pen touch detection signal (PENTOUCH) and for receiving a convert command from a host processor (3) and operative to produce an interrupt signal (IRQ) to be sent to the host processor (3) in response to the pen touch detection signal (PENTOUCH) if the first level is received, and operative to reset the interrupt signal (IRQ) in response to the pen touch detection signal (PENTOUCH) if the second level is received before the convert command is received from the host processor (3), the interrupt signal (IRQ) representing an interrupt service request for the convert command, wherein resetting of the interrupt signal (IRQ) cancels the interrupt service request. In the described embodiment, the pen touch detection circuit (2B) includes a first transistor (32) having a source coupled to a first terminal (27) of the touch screen assembly (30,31) and a drain coupled to an input (36) of a digital buffer (38), a pull-up resistor (39). The control circuit (41A) includes a finite state machine (58A) for controlling the first transistor (32) and generating the interrupt signal (IRQ) in response to the first level of the pen touch detection signal (PENTOUCH) and for resetting the interrupt signal (IRQ) in response to the second level of the pen touch detection signal (PENTOUCH). The finite state machine (58A) resets the interrupt signal (IRQ) if the second level of the pen touch detection signal (PENTOUCH) is received before the convert command is received from the host processor (3).

In a described embodiment, the finite state machine (58A) performs the functions of turning off the first transistor (32) and turning on a second transistor (35) after the convert command has been received from the host processor (3) and before beginning analog to digital conversion of coordinate voltages of the detected touch point (Q). The pull-up resistor (39) is coupled between the input (36) of the digital buffer (38) and a first reference voltage (VDD). A resistance of the pull-up resistor (39) is substantially greater than a total resistance through the first (30) and second (31) resistive sheets, the touch point (Q), and a third transistor (21) coupled between a second reference voltage (GND) and the source of the first transistor (32) to thereby cause the first level of the pen touch detection signal (PENTOUCH) to be a low voltage and the second level of the pen touch detection signal (PENTOUCH) to be a high voltage.

In a described embodiment, the finite state machine (58A) controls the first transistor (32) by turning it on during a pen touch detection to produce the first level of the pen touch detection signal (PENTOUCH) and turning the first transistor (32) off to isolate the input (36) of the digital buffer (58A) from terminals (24,25,26,27) of the touch screen assembly (30,31) during analog to digital conversion of touch point coordinate voltages on the terminals (24,25,26,27), respectively. Finite state machine (58A) also controls a second transistor (35) to hold the input (36) of the digital buffer (38) at the first level of the pen touch detection signal (PENTOUCH) while the first transistor (32) is off. The host processor (3) does not communicate with the touch screen controller (1A) to determine whether a detected touch point (Q) is valid.

In one embodiment, the invention provides a method of operating a touch screen controller (1A) including generating a pen touch detection signal (PENTOUCH) having a first level if a touch point (Q) of a touch screen assembly (30,31) is detected, and generating a second level of the pen touch detection signal (PENTOUCH) if the touch point (Q) is not detected, generating an interrupt signal (IRQ) to be sent to a host processor (3) in response to the first level of the pen touch detection signal (PENTOUCH), and resetting the interrupt signal (IRQ) in response to the second level of the pen touch detection signal (PENTOUCH) if the second level is received before a convert command is received from the host processor (3), wherein the interrupt signal (IRQ) represents an interrupt service request for a convert command from the host processor (3), and wherein resetting of the interrupt signal (IRQ) cancels the interrupt service request. Analog to digital conversion of the touch point coordinate voltages is performed in response to the convert command from the host processor (3), wherein the host processor (3) does not communicate with the touch screen controller (1A) to determine whether a detected touch point (Q) is valid.

In one embodiment, the invention provides touch screen controller including means (2B) for generating a pen touch detection signal (PENTOUCH) having a first level if a touch point (Q) of a touch screen assembly (30,31), and generating a second level of the pen touch detection signal (PENTOUCH) if a touch point (Q) is not detected, means (58A,52) for generating an interrupt signal (IRQ) to be sent to a host processor (3) in response to the first level of the pen touch detection signal (PENTOUCH), and means (58A,63) for resetting the interrupt signal (IRQ) in response to the second level of the pen touch detection signal (PENTOUCH) if the second level is received before a convert command is received from the host processor (3), wherein the interrupt signal (IRQ) represents an interrupt service request for a convert command from the host processor (3), and wherein resetting of the interrupt signal (IRQ) cancels the interrupt service request.

DETAILED DESCRIPTION OF THE PREFERRED EMBODIMENTS

Figure 1:
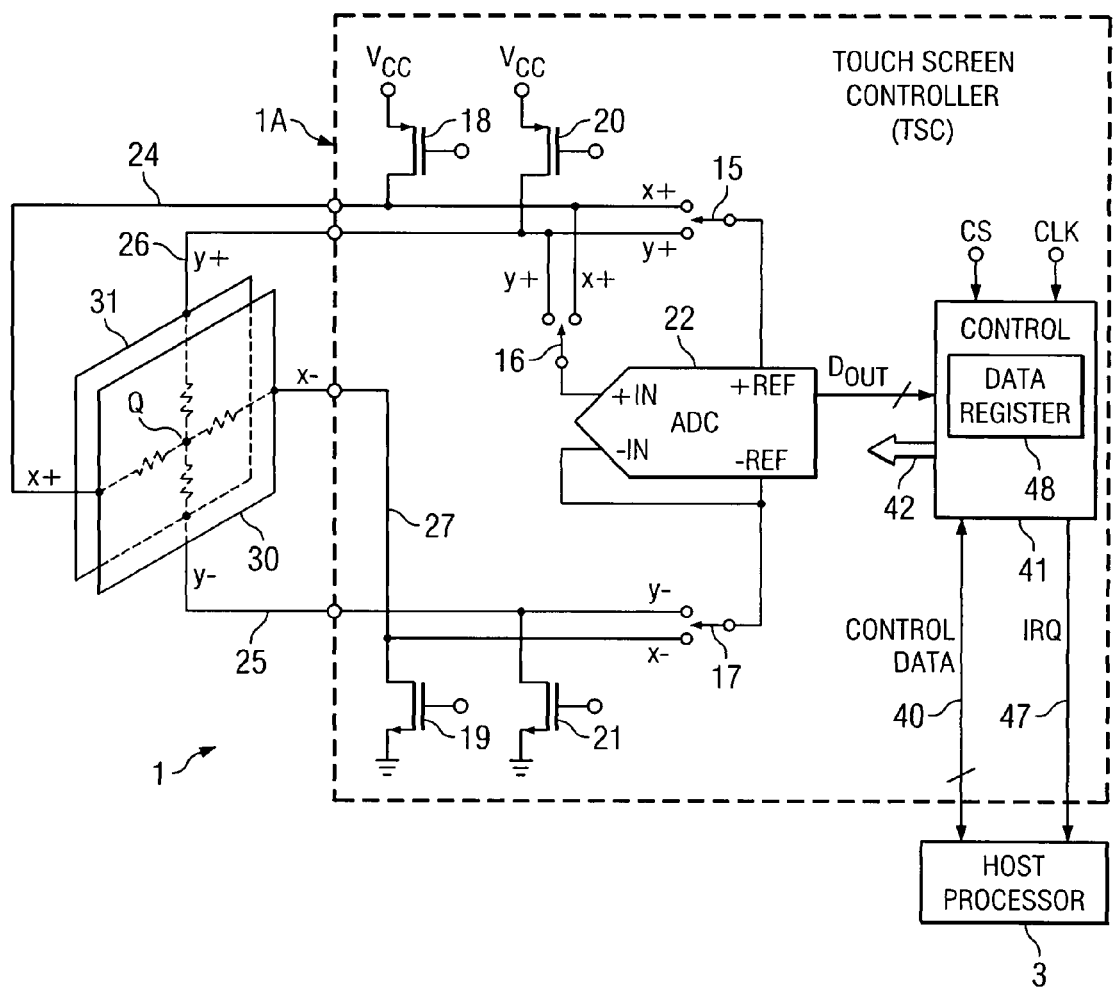
FIG. 1 is a schematic diagram showing the touch point coordinate conversion part of a prior art touch screen controller.
Figure 4:
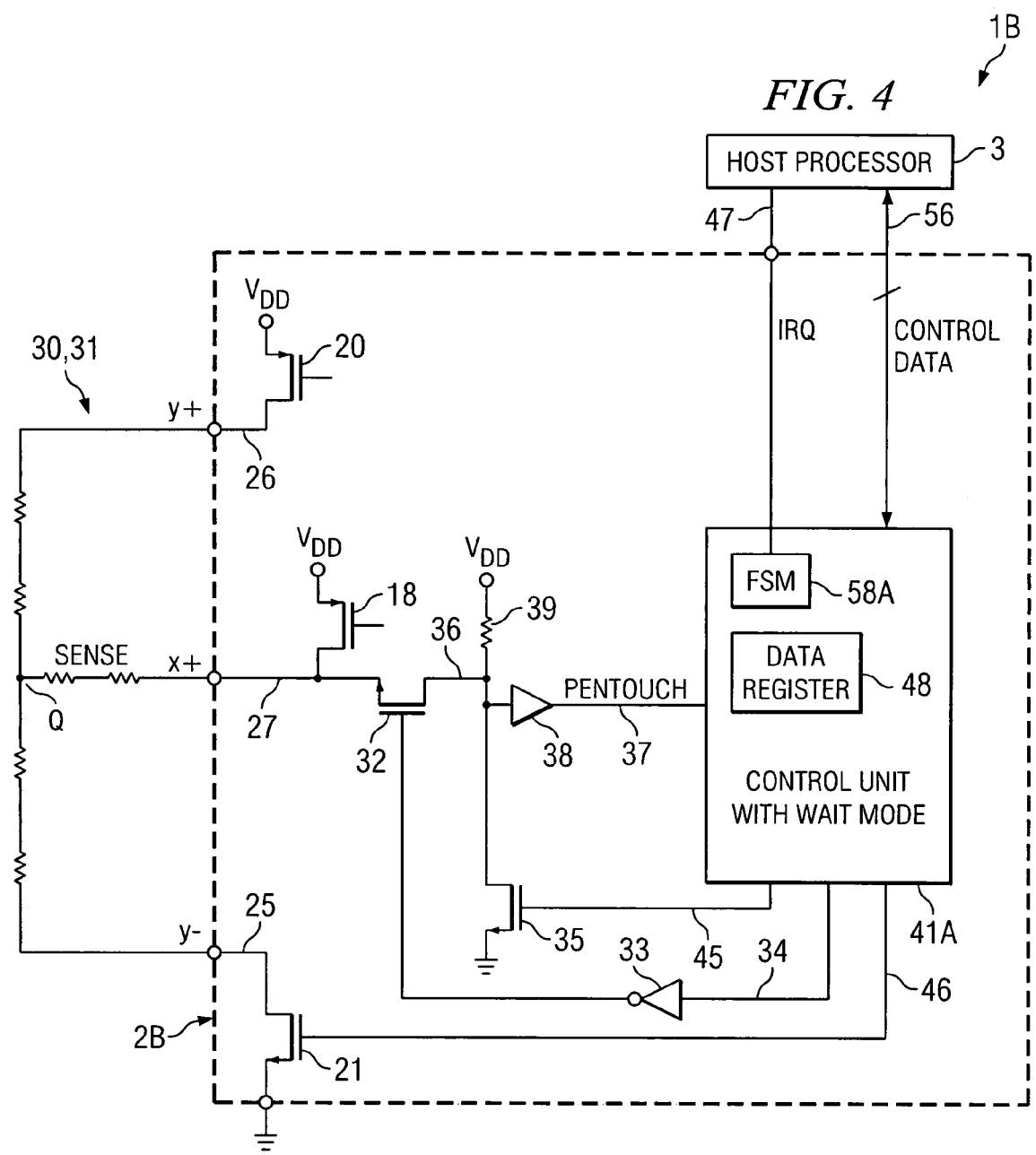
FIG. 4 is a schematic diagram including a touch screen controller including wait mode pen-touch detection circuitry of the present invention.

FIG. 4 shows a simplified diagram pen-touch detection circuit 2B which, in accordance with the present invention, is included in touch screen controller 1A of FIG. 1. Pen-touch detection circuit 2B includes previously mentioned N-channel driver transistor 21 of FIG. 1A coupled between y-conductor 25 and ground, with its gate connected by conductor 46 to control unit 41A which is similar to control unit 41 of Prior Art FIG. 2 and further includes improvements in accordance with the present invention. For clarity, driver transistors 18 and 20 of FIG. 1 coupled between $V_{DD}$ and conductors 27 and 26, respectively, are also shown in FIG. 4. However, it should be noted that driver transistors 18, 19, 20 and 21 also may be considered to be external to pen-touch detection circuit 2B x+ conductor 27 is coupled to the source of N-channel transistor 32, the drain of which is connected by conductor 36 to one terminal of a pull-up resistor 39, to the input of digital buffer circuit 38, and to the drain of N-channel transistor 35, the source of which is connected to ground. The other terminal of pull-up resistor 39 is connected to $V_{DD}$. The gate of transistor 32 is connected to the output of an inverter 33 having its input connected by conductor 34 to control unit 41A. The gate of transistor 35 is connected by conductor 45 to control unit 41A. The output of digital buffer 38 produces a pen-touch signal PENTOUCH on conductor 37 and applies it to an input of control unit 41A. Control unit 41A produces an interrupt request signal IRQ on conductor 47 and applies it to an interrupt request input of host processor 3.

Figure 2:
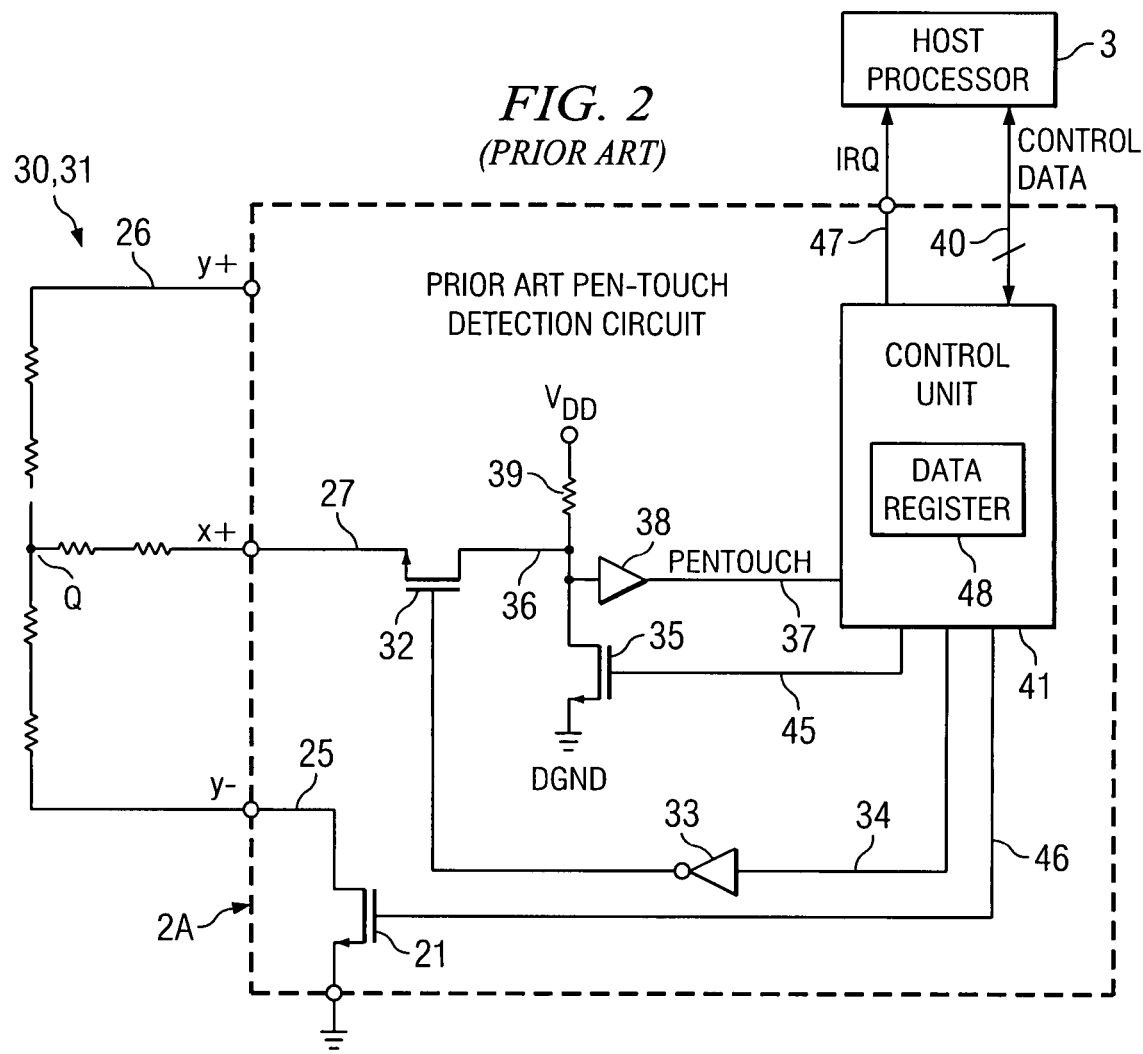
FIG. 2 is a partial schematic diagram showing prior art pen-touch detection circuitry that is included in the touch screen controller of FIG. 1.

As in Prior Art FIG. 2, transistor 35 is turned on in response to a signal from control unit 41A via conductor 45 in order to "hold" or maintain the pen-touch detection signal PENTOUCH at a low level after a touch point Q has been detected, because as soon as that happens, transistor 32 must be turned off to isolate the touch point coordinate conversion circuitry from the pen-touch detection circuitry so that control unit 41A can turn on the various driver transistors 18, 19, 20 and 21 shown in FIG. 1 to initiate conversion of the x and y coordinate voltages of the detected touch point Q into corresponding digital values by means of ADC 22.

Pen-touch detection circuitry 2B in FIG. 4 is included in touch screen controller 1A of FIG. 1 in accordance with the present invention and indicates whether or not there presently is a touch point Q producing electrical contact between the x resistive sheet 30 and the y resistive sheet 31 due to a sufficient amount of pen-touch pressure at the touch point Q. When transistor 21 is turned on, pen-touch detection circuit 2B of FIG. 4 is ready for pen-touch detection operation. There is a current path from $V_{DD}$ to ground, through pull-up resistor 39, through transistor 32, x+port conductor 27, the x and y touch screen resistances coupled in series by electrical contact at touch point Q, and driver transistor 21. This current path results in voltage division that establishes a low value of the signal PENTOUCH on conductor 37 when there is a touch point Q and a high value of PEN-TOUCH when there is no touch point Q. A finite state machine (FSM) 58A in control unit 41A generates the interrupt signal IRQ on conductor 47. Finite state machine 58A is partly defined by its operation as described in the flowchart of subsequently described FIG. 5.

Figure 5:
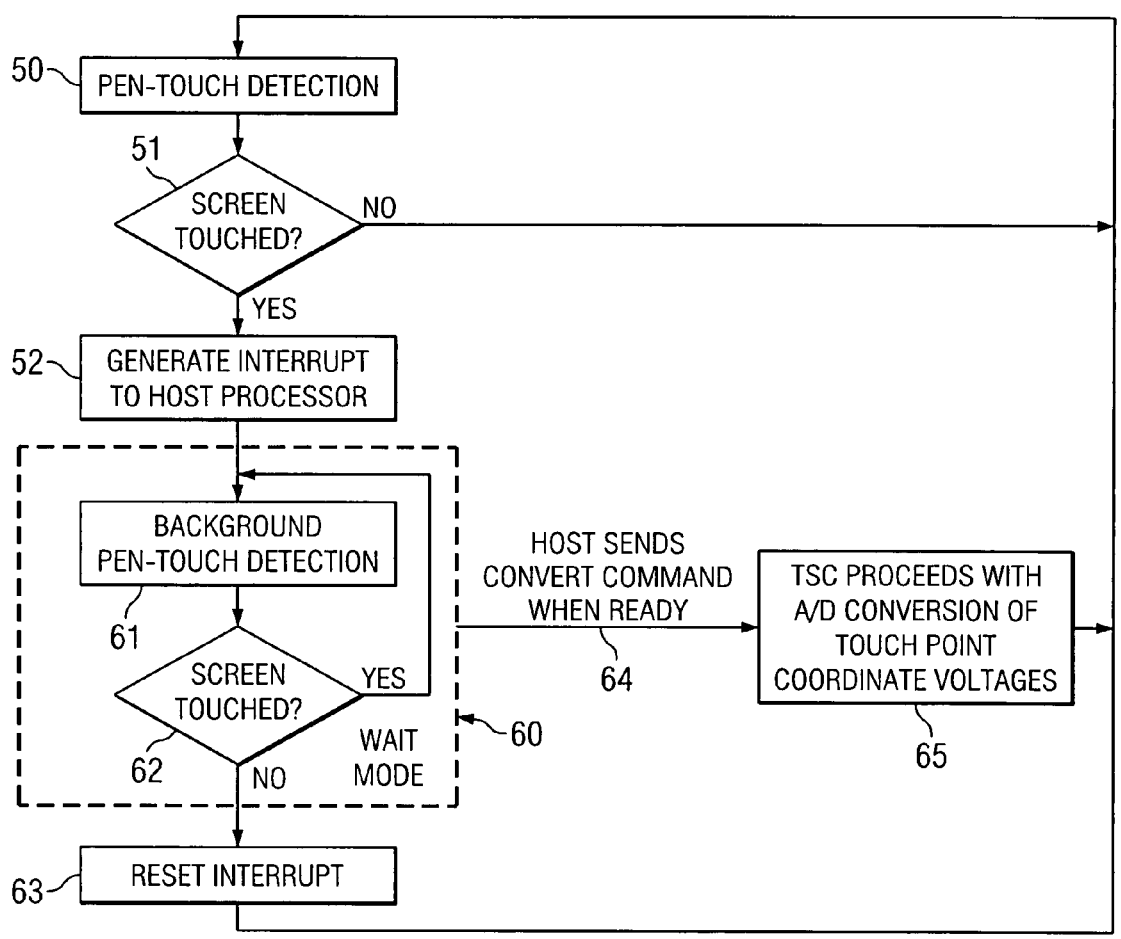
FIG. 5 is a flowchart for a wait mode pen-touch detection algorithm executed by the pen-touch detection circuitry in FIG. 4.

The pen-touch detection process of block 50 in the flowchart of subsequently described FIG. 5 is performed by means of the pen-touch detection circuit 2B of FIG. 4, in which transistors 18, 20, 21, 32, and 35 are controlled by finite state machine 58A. If there presently is no pen-touch point Q, the source of transistor 32 sees an open circuit. The driver transistors 18 and 20 are off, y-driver transistor 21 is on, and transistor 32 is turned off, and transistor 35 is turned off. The x and y touch screen resistances are much lower than the resistance of pull-up resistor 39, so when a pen-touch point connection Q is made, the resulting voltage division causes the input conductor 36 of digital buffer 38 to be close to ground. In response to the low voltage on conductor 36, digital buffer 38 causes the corresponding low voltage pen touch signal PENTOUCH on conductor 37 to be at a low level. The IRQ signal on conductor 47, which represents a host processor interrupt request generated by control unit 41A, is generated in response to the low level of pen-touch detection signal PENTOUCH.

Figure 3:
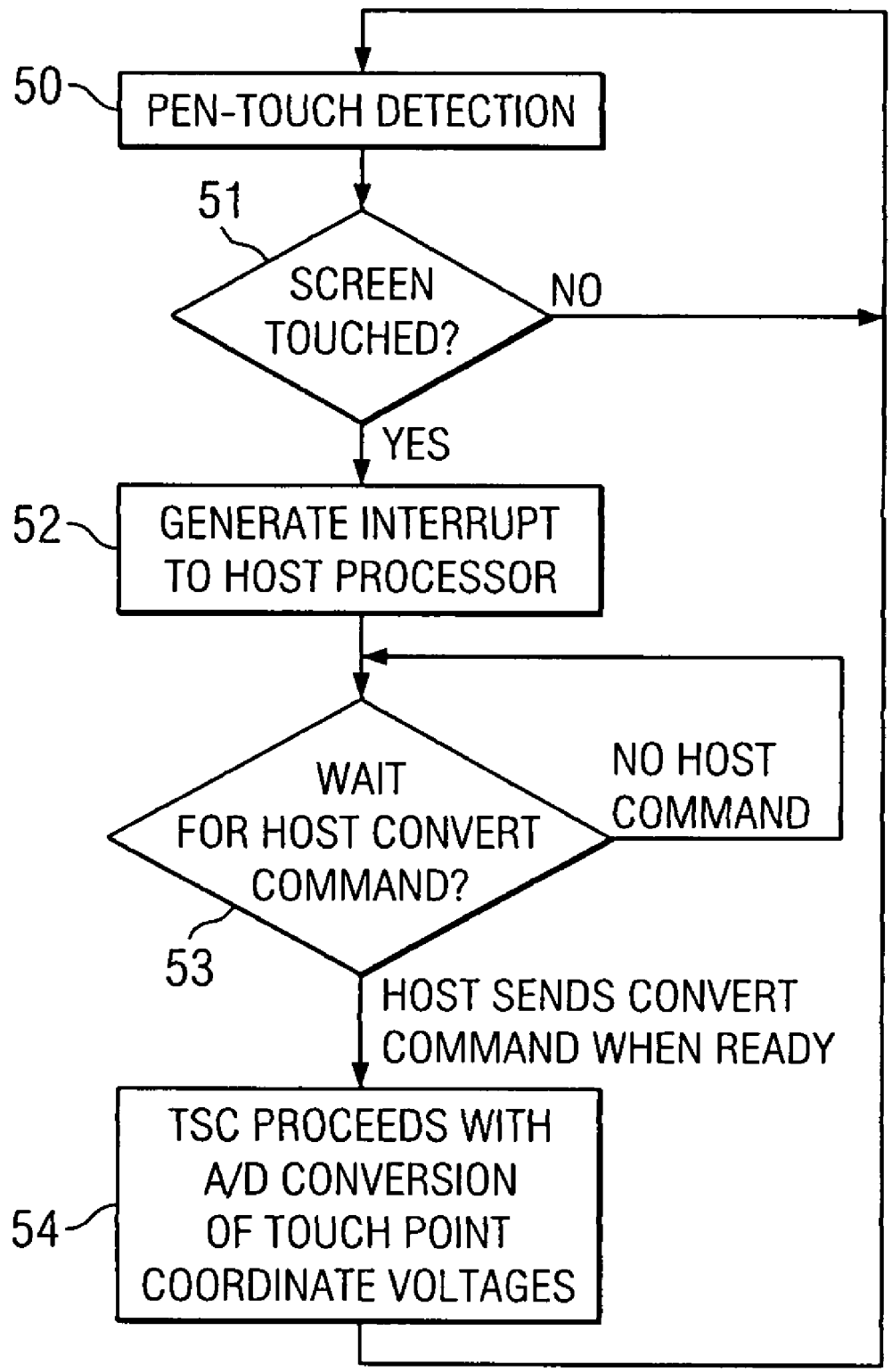
FIG. 3 is a flowchart of a pen-touch algorithm executed by the control unit in the prior art pen-touch detection circuitry of FIG. 2.

Referring to the flowchart of FIG. 5, it should be noted that blocks 50, 51, and 52 are similar to the corresponding blocks in Prior Art FIG. 3. In FIG. 5, the operation of pen-touch detection circuit 2B is generally indicated in blocks 50 and 51 of FIG. 3. If the determination of decision block 51 is negative, pen-touch detection circuit 2A returns to the beginning of pen-touch detection block 50 and "idles" until an affirmative determination is made. When an affirmative determination is made in accordance with decision block 51, touch screen controller 2A generates an interrupt request signal IRQ and sends it via conductor 47 to host processor 3, as indicated in block 52, and then goes to decision block 53 and simply waits for host processor 3 to decide to send a convert command to touch screen controller 1A in response to IRQ. When this eventually happens, touch screen controller 1A proceeds with analog to digital conversion of the present x and y touch point coordinate voltages on conductors 24, 25, 26 and 27.

According to the present invention, after the interrupt request generated in accordance with block 52, pen-touch detection circuit 2B immediately goes into a "wait mode" as generally indicated in block 60, during which finite state machine 50 of control unit 41A waits for host processor 3 to send a convert command via the CONTROL DATA bus 40 back to control unit 41A in response to the interrupt request of block 52. During the wait mode, finite state machine 58A continues to perform a "background" pen-touch detection operation as indicated in block 61 (which is similar or identical to the pen-touch detection operation of block 50), and also determines whether PENTOUCH on conductor 37 remains at a low level. If the determination of decision block 61 is affirmative, the "background" pen-touch detection operation of block 61 and decision block 65 continues.

However, if the present touch point Q disappears, then the algorithm represented by the flowchart of FIG. 5 goes to block 63 and resets the interrupt request signal IRQ and then returns to block 50. The resetting of IRQ causes host processor 3 to cancel the requested convert command.

Thus, if the present touch point Q continues to be valid, the wait mode operation continues until host processor 3 decides to send a convert command back to touch screen controller 41A in response to the earlier interrupt request. When that occurs, touch screen controller 41A proceeds with the analog to digital conversion of the x and y touch point coordinate voltages of the present (and hence valid) touch point Q, as indicated in block 65. Only after analog to digital conversion of the present valid touch point is complete does the algorithm represented by the flowchart of FIG. 5 return to the pen-touch detection operation of block 50. This substantially reduces the data traffic load back and forth between host processor 3 and touch screen controller 2A, and also facilitates development and use of application software, and prevents touch screen controller 1A and the host processor from wasting a substantial amount of time and power performing analog to digital conversions of false pen-touch detections.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. Touch screen controller circuitry comprising:
   a host processor;
   a touch screen assembly having first and second resistive screens and having a first, second, and third terminals;
   pen touch detection circuitry for providing a pen touch detection signal having a first level if a touch point of touch screen assembly is detected, wherein the pen touch detection circuitry includes:
   a first transistor that is coupled to a first terminal of the touch screen assembly at its source;
   a second transistor that receives a first reference voltage at its source and that is coupled to a second terminal of the touch screen assembly at its drain;
   a third transistor that receives a second reference voltage at its source and that is coupled to a third terminal of the touch screen assembly at its drain
   a buffer that is coupled to the drain of the first transistor, wherein the buffer generates a pen touch detection signal;
   a pull-up resistor that is coupled to the drain of the first transistor, wherein a resistance of the pull-up resistor is substantially greater than a total resistance through the first and second resistive sheets, the touch point, and the third transistor coupled between the second reference voltage and the source of the first transistor to thereby cause the first level of the pen touch detection signal to be a low voltage and a second level of the pen touch detection signal to be a high voltage; and
   a control circuit for receiving the pen touch detection signal and for receiving a convert command from the host processor and operative to produce an interrupt signal to be sent to the host processor in response to the pen touch detection signal if the first level is received, and operative to reset the interrupt signal in response to the pen touch detection signal if the second level is received before the convert command is received from the host processor, the interrupt signal representing an interrupt service request for the convert command, wherein resetting of the interrupt signal cancels the interrupt service request.

2. The touch screen controller circuitry of claim 1, wherein the control circuit includes a finite state machine for controlling the first transistor and generating the interrupt signal in response to the first level of the pen touch detection signal and for resetting the interrupt signal in response to the second level of the pen touch detection signal.

3. The touch screen controller circuitry of claim 2, wherein the finite state machine resets the interrupt signal if the second level of the pen touch detection signal is received before the convert command is received from the host processor.

4. The touch screen controller circuitry of claim 3, wherein the finite state machine performs the functions of turning off the first transistor and turning on a second transistor after the convert command has been received from the host processor and before beginning analog to digital conversion of coordinate voltages of the detected touch point.

5. The touch screen controller circuitry of claim 2, wherein the finite state machine controls the first transistor by turning it on during a pen touch detection to produce the first level of the pen touch detection signal and turning the first transistor off to isolate the input of the digital buffer from terminals of the touch screen assembly during analog to digital conversion of touch point coordinate voltages on the terminals respectively, and wherein the finite state machine also controls a second transistor to hold the input of the digital buffer at the first level of the pen touch detection signal while the first transistor is off, wherein the host processor does not communicate with the touch screen controller to determine whether a detected touch point is valid.

6. The touch screen controller circuitry of claim 5, wherein the first and second transistors are N-channel transistors, and wherein the first reference voltage is greater than the second reference voltage.

7. The touch screen controller circuitry of claim 1, wherein the third transistor is a driver transistor of the touch screen controller.

8. The touch screen controller of claim 5, wherein the control circuit includes a data register for storing analog to digital conversion results to be read by the host processor.

9. The touch screen controller of claim 5, wherein the finite state machine controls the analog to digital conversion of the touch point coordinate voltages in response to the convert command from the host processor.

10. The touch screen controller of claim 5, wherein the control circuit is coupled to gate electrodes of the first, second, and third transistors.

11. A method of operating a touch screen controller, comprising:
operating a finite state machine to turn on a first transistor coupled between a first reference voltage and the source of a second transistor to cause a first level of a pen touch detection signal to be a low voltage and a second level of the pen touch detection signal to be a high voltage;
generating a pen touch detection signal having a first level if a touch point of a touch screen assembly is detected;
generating a second level of the pen touch detection signal if the touch point is not detected;
generating an interrupt signal to be sent to a host processor in response to the first level of the pen touch detection signal; and
resetting the interrupt signal in response to the second level of the pen touch detection signal if the second level is received before a convert command is received from the host processor, wherein the interrupt signal represents an interrupt service request for a convert command from the host processor, and wherein resetting of the interrupt signal cancels the interrupt service request.

12. The method of claim 11, wherein the method further comprises controlling the second transistor having a source coupled to a first terminal of the touch screen assembly and a drain coupled to an input of a digital buffer to cause the digital buffer to generate the first level of the pen touch detection signal in response to the touch point, and generating the interrupt signal and resetting the interrupt signal by means of the finite state machine.

13. The method of claim 12, wherein the method further comprises operating the finite state machine to turn off the second transistor and turn on a third transistor after the convert command has been received from the host processor and before beginning analog to digital conversion of coordinate voltages of the detected touch point.

14. The method of claim 13, wherein the method further comprises operating the finite state machine to control the second transistor by turning it on during a pen touch detection to produce the first level of the pen touch detection signal and turning the second transistor off to isolate the input of the digital buffer from terminals of the touch screen assembly during analog to digital conversion of touch point coordinate voltages on the terminals, respectively, and to control of the third transistor to hold the input of the digital buffer at the first level of the pen touch detection signal while the second transistor is off.

15. The method of claim 11 including controlling analog to digital conversion of the touch point coordinate voltages in response to the convert command from the host processor wherein the host processor does not communicate with the touch screen controller to determine whether a detected touch point is valid.

16. An apparatus comprising:
a first touch screen controller terminal;
a second touch screen controller terminal;
a third touch screen controller terminal;
a data bus;
a first transistor that is coupled to the first touch screen controller terminal at its drain and that receives a first voltage at its source;
a second transistor that is coupled to the second touch screen controller terminal at its drain and that receives a second voltage at its source;
a third transistor that is coupled to the third touch screen terminal at its source;
a buffer that is coupled to the third transistor, wherein the buffer outputs a pen touch detection signal, wherein a first level of the pen touch detection signal indicates the detection of a touch point, and wherein a second level of the pen touch detection signal indicates no detection of a touch point;
a control unit that is coupled to the buffer so as to receive the pen touch detection signal and that is coupled to the gate of the third transistor, wherein the control unit generates an interrupt signal in response to a first level of the pen touch detection signal, and wherein the control unit resets the interrupt signal in response to a second level of the pen touch detection signal before the convert command is received over the data bus; and a resistor that is coupled to a node between the third transistor and the buffer and that receives the first voltage, wherein the resistance of the resistor is sufficiently large to cause the first level of the pen touch detection signal to be a lower voltage than the second level of the pen touch detection signal.

17. The apparatus of claim 16, wherein the control unit further comprises a finite state machine that generates an interrupt signal in response to the first level of the pen touch detection signal and that resets the interrupt signal in response to the second level of the pen touch detection signal.

18. The apparatus of claim 17, wherein the apparatus further comprises an inverter that is coupled between the control unit and the gate of the third transistor.

19. The apparatus of claim 18, wherein the apparatus further comprises a touch screen assembly that is coupled to the first, second, and third touch screen controller terminals.

\* \* \* \* \*